(12) United States Patent
Zhou et al.

(10) Patent No.: US 11,080,957 B2
(45) Date of Patent: Aug. 3, 2021

(54) METHOD FOR DETECTING FAULT OF SMART DOOR LOCK, SMART DOOR LOCK AND STORAGE MEDIUM (71) Applicant: SHENZHEN GOODIX TECHNOLOGY CO., LTD., Guangdong (CN)

(72) Inventors: Wei Zhou, Guangdong (CN); Qingbin Li, Guangdong (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/844,259

(22) Filed: Apr. 9, 2020

(65) Prior Publication Data
US 2020/0242866 A1 Jul. 30, 2020

Related U.S. Application Data (63) Continuation of application No. PCT/CN2019/073926, filed on Jan. 30, 2019.

(51) Int. Cl.
G07C 9/00 (2020.01)
G06F 11/07 (2006.01)
G06F 11/30 (2006.01)

(52) U.S. Cl.
CPC ...... *G07C 9/00571* (2013.01); *G06F 11/0736* (2013.01); *G06F 11/3062* (2013.01); *G07C 9/00309* (2013.01); *G07C 2209/62* (2013.01)

(58) Field of Classification Search
CPC ............ G07C 9/00571; G07C 9/00309; G07C 2209/62; G06F 11/0736; G06F 11/3062
See application file for complete search history.

(56) References Cited

U.S. PATENT DOCUMENTS

| 5,172,967 A | 12/1992 | Pipe |
| 2008/0216156 A1* | 9/2008 | Kosaka ............... G07C 9/27 726/4 |

(Continued)

FOREIGN PATENT DOCUMENTS

| CN | 102747891 A | 10/2012 |
| CN | 205894908 U | 1/2017 |

(Continued)

OTHER PUBLICATIONS

Extended European Search Report for European Patent Application No. 19868171.0 dated Oct. 28, 2020.

(Continued)

*Primary Examiner* — Nabil H Syed
(74) *Attorney, Agent, or Firm* — Heslin Rothenberg Farley & Mesiti P.C.

(57) ABSTRACT

Some embodiments of the present disclosure provide a method for detecting a fault of a smart door lock, a smart door lock and a storage medium. The smart door lock includes a plurality of unlocking modules, and the method for detecting a fault of the smart door lock includes: monitoring state information of each of the unlocking modules independently; and sending fault information of an unlocking module in an abnormal state to a terminal device after monitoring the unlocking module in the abnormal state. By adopting the embodiments of the present disclosure, specific fault information of a fault which occurs can be accurately and timely known, and a specific position where the fault occurs may be located, which effectively reduces difficulties in detecting the fault and repairing the smart door lock.

20 Claims, 5 Drawing Sheets (56) References Cited

U.S. PATENT DOCUMENTS

| | | | |
|---|---|---|---|
| 2013/0298616 A1* | 11/2013 | Ullrich | E05B 47/0012 |
| | | | 70/278.1 |
| 2014/0266584 A1* | 9/2014 | Ingle | A24F 15/005 |
| | | | 340/5.28 |
| 2016/0133071 A1 | 5/2016 | Henderson | |
| 2017/0051530 A1* | 2/2017 | Colman | E05B 45/083 |
| 2017/0163519 A1* | 6/2017 | Bowers | H04L 43/50 |
| 2021/0174619 A1* | 6/2021 | Liu | E05B 41/00 |

FOREIGN PATENT DOCUMENTS

| | | |
|---|---|---|
| CN | 107764543 A | 3/2018 |
| EP | 2746498 A2 | 6/2014 |
| WO | 2017088354 A1 | 6/2017 |

OTHER PUBLICATIONS

International Search Report for International Application No. PCT/CN2019/073926 dated Jan. 30, 2019.

\* cited by examiner

METHOD FOR DETECTING FAULT OF SMART DOOR LOCK, SMART DOOR LOCK AND STORAGE MEDIUM

CROSS-REFERENCE TO RELATED APPLICATIONS

The present application is a continuation of international application No. PCT/CN2019/073926, filed on Jan. 30, 2019, which is hereby incorporated by reference in its entireties.

TECHNICAL FIELD

The present disclosure relates to security technologies, and more particularly, to a method for detecting a fault of a smart door lock, a smart door lock and a storage medium.

BACKGROUND

Smart door locks are improved on a basis of traditional mechanical locks, have higher security and are more intelligent and simplified in identification management. With a development of science and technology, the smart door locks now can support various unlocking ways at the same time, such as near field communication (NFC) unlocking, Bluetooth unlocking, fingerprint unlocking and password unlocking, so the smart door locks will gradually replace the traditional mechanical locks in terms of status.

However, because a smart door lock system further has a variety of software and hardware modules compared with the traditional mechanical lock, there is a greater probability that faults occur inside the smart door lock. At the same time, a structure of the smart door lock is more complex, so that it is also more difficult to locate an exact position where the fault occurs inside the door lock.

SUMMARY

An objective of some embodiments of the present disclosure is to provide a method for detecting a fault of a smart door lock, a smart door lock and a storage medium, so as to solve the problem that it is more difficult to detect and locate a fault of the smart door lock.

An embodiment of the present disclosure provides a method for detecting a fault of a smart door lock. The smart door lock includes a plurality of unlocking modules, and the method for detecting a fault of the smart door lock includes: monitoring state information of each of the unlocking modules independently; and sending fault information of an unlocking module in an abnormal state to a terminal device after monitoring the unlocking module in the abnormal state.

An embodiment of the present disclosure further provides a smart door lock, which includes: a plurality of unlocking modules, at least one processor connected with the plurality of unlocking modules, and a memory connected and communicated with the at least one processor, where the memory stores instructions executable by the at least one processor, and the instructions are executed by the at least one processor to perform the above-described method for detecting a fault of the smart door lock.

An embodiment of the present disclosure further provides a computer-readable storage medium for storing a computer program, where the computer program, when executed by the processor, performs the above-described method for detecting a fault of the smart door lock.

Compared with existing technologies, the state information of each of the unlocking modules are independently monitored in the embodiments of the present disclosure, so that the state information of each of the unlocking modules can be clearly and unambiguously obtained, and the fault information of the unlocking module in the abnormal state is sent to the terminal device after the unlocking module in the abnormal state is monitored, so that a user can accurately and timely know, through the terminal device, the specific information of the fault which occurs, and locate a specific position where the fault occurs, which effectively reduces difficulties in detecting the fault and maintaining the smart door lock.

For example, monitoring state information of each of the unlocking modules independently includes: reading the state information recorded in each thread corresponding to each of the unlocking modules respectively; and determining an unlocking module to be in an abnormal state when the state information recorded in a thread corresponding to a module is abnormal. Since each of the unlocking modules corresponds to a separate thread for management, a state of each of the unlocking modules is obtained by reading the state information of the module recorded in each thread corresponding to each of the unlocking modules respectively, which is easy to be implemented and not easy to confuse the state information of each of the unlocking modules.

For example, the thread corresponding to the module records the state information as abnormality when the unlocking module meets the following condition: the unlocking module fails to send or receive data for more than a preset number of times. When the unlocking module is out of operation, the unlocking module cannot send and receive data normally, and therefore, when the unlocking module fails to send and receive data for more than the preset number of times, the unlocking module may be determined to be in the abnormal state.

For example, the fault information includes a fault type, and before sending fault information of an unlocking module in an abnormal state to a terminal device, the method further includes: detecting whether a current voltage value of the unlocking module in the abnormal state is lower than a preset threshold value, and determining the fault type to be a low power if the current voltage value of the unlocking module in the abnormal state is lower than the preset threshold value. By detecting the fault type, it is convenient for a user and maintenance personnel to take corresponding maintenance measures to repair the fault of the smart door lock according to the fault type.

For example, detecting whether a current voltage value of the unlocking module in the abnormal state is lower than a preset threshold value includes: detecting whether the current voltage value of the unlocking module in the abnormal state is lower than the preset threshold value by using an analog-to-digital conversion ADC module built into the smart door lock.

For example, sending fault information of an unlocking module in an abnormal state to a terminal device includes: sending the fault information to the terminal device through a short-range wireless communication module; or, sending the fault information to a cloud server through a network communication module, and sending the fault information to the terminal device via the cloud server; or, sending the fault information to a relay device through the short-range wireless communication module, and sending the fault information to the terminal device through the cloud server via the relay device. Various ways of reporting the fault information are provided above, to meet the needs of various users, which are convenient, fast, and easy to be implemented, and effectively improve feasibility and practicability in this embodiment.

For example, the method for detecting a fault of the smart door lock further includes: receiving a processing command fed back by the terminal device according to the fault information; and repairing the unlocking module in the abnormal state according to the processing command, so that some minor faults of the smart door lock can be repaired autonomously, without affecting normal use of the smart door lock.

For example, repairing the unlocking module in the abnormal state according to the processing command includes: resetting the unlocking module in the abnormal state when the processing command is a reset command; or closing the unlocking module in the abnormal state when the processing command is a close command. In this way, the fault of the unlocking module can be repaired through a reset operation without affecting the normal use of the smart door lock, or dispatching the maintenance personnel, and when the fault of the unlocking module may not be solved by the reset operation, the unlocking module is closed, waiting for professional maintenance personnel to repair, so as to save power consumption of the smart door lock.

For example, resetting the unlocking module in the abnormal state includes: resetting the unlocking module in the abnormal state through a low dropout LDO regulator module built into the smart door lock; closing the unlocking module in the abnormal state includes: closing the unlocking module in the abnormal state through the LDO regulator module.

For example, the smart door lock further includes a main processor and a auxiliary processor that are configured to control the plurality of unlocking modules, and the method further includes: monitoring a state of the main processor when the plurality of unlocking modules are controlled by the main processor, and switching a control of the plurality of unlocking modules to the auxiliary processor and shutting down the main processor, when the main processor is monitored to be in an abnormal state; and monitoring a state of the auxiliary processor when the plurality of unlocking modules are controlled by the auxiliary processor, and switching the control of the plurality of unlocking modules to the main processor and shutting down the auxiliary processor, when the auxiliary processor is monitored to be in an abnormal state.

For example, the smart door lock further includes: a watchdog timer WDT connected with the main processor and connected with the auxiliary processor, and monitoring a state of the main processor includes: monitoring whether the main processor is in an abnormal state by the WDT, and monitoring a state of the auxiliary processor includes: monitoring whether the auxiliary processor is in an abnormal state by the WDT.

For example, after monitoring the unlocking module in the abnormal state, the method further includes: controlling the smart door lock to display the fault information of the smart door lock to intuitively display the fault information on the smart door lock, so that the fault information of the smart door lock may be known even without the terminal device, especially in a situation where the network communication module of the smart door lock is out of operation and cannot report the fault information.

BRIEF DESCRIPTION OF THE DRAWINGS

One or more embodiments are exemplarily explained through the figures in the corresponding accompanying drawings, these exemplary descriptions do not constitute a limitation to the embodiments, elements with the same reference numerals are represented as similar elements, and unless otherwise specifically stated, the figures in the accompanying drawings do not constitute a proportion limitation.

DETAILED DESCRIPTION

In order to make objectives, technical solutions and advantages of the embodiments of the present disclosure more apparent, some embodiments of the present disclosure will be further explained in detail below in conjunction with the drawings and the embodiments. It should be understood that the specific embodiments described here are merely used for explaining the present disclosure, and not intended to limit the present disclosure.

Figure 1:
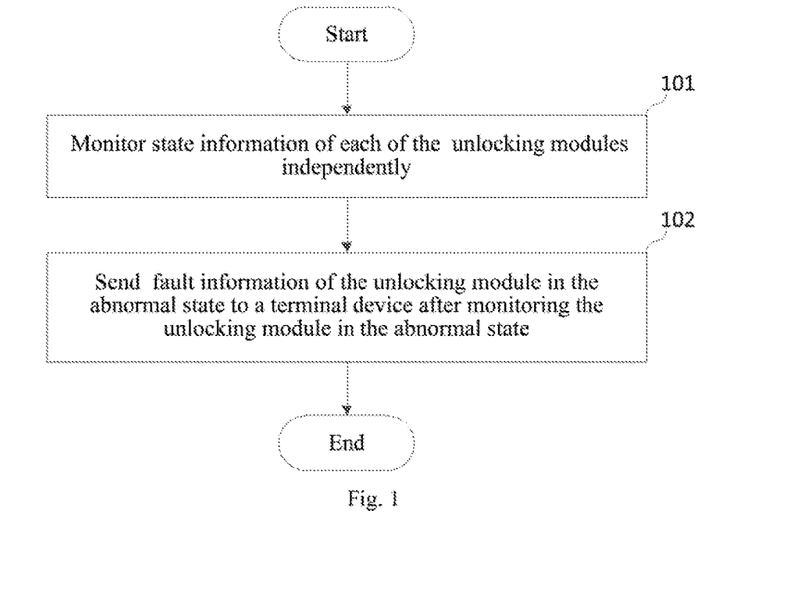
FIG. 1 is a flow chart of a method for detecting a fault of a smart door lock according to a first embodiment of the present disclosure.

A first embodiment of the present disclosure relates to a method for detecting a fault of a smart door lock, and a specific process is as shown in FIG. 1

Figure 2:
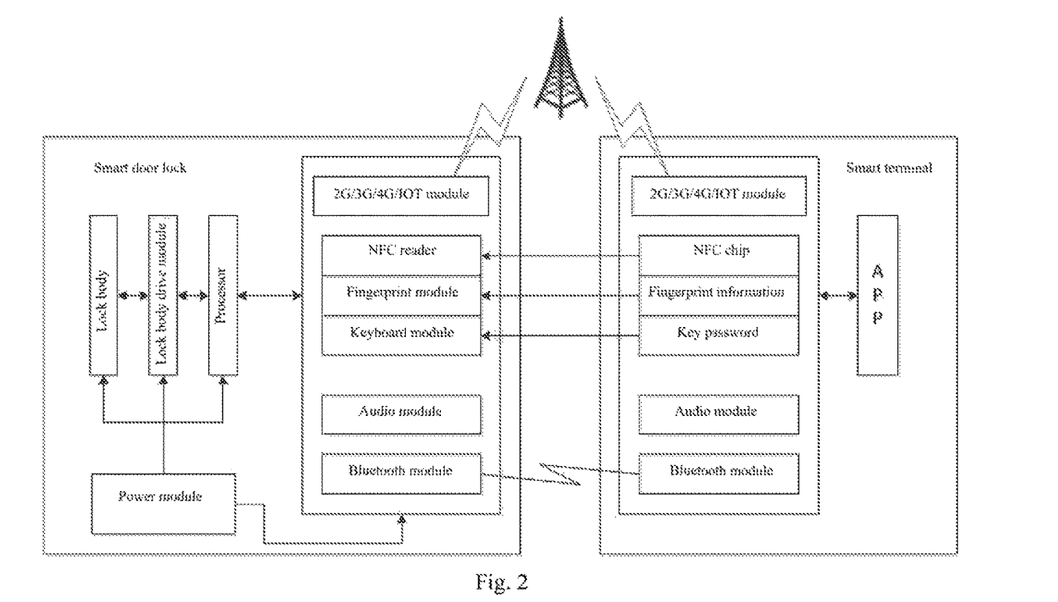
FIG. 2 is a system structural diagram of the smart door lock according to the first embodiment of the present disclosure.

In this embodiment, the smart door lock can support various unlocking ways, and can be connected with a smart terminal for use in cooperation with each other, and a specific system structural diagram of the smart door lock is as shown in FIG. 2. The smart door lock according to this embodiment includes: a lock body, a lock body drive module, a processor, a power module, an audio module, a network communication module (a 2G/3G/4G/Internet of Things (IOT) module) and a plurality of unlocking modules (a near field communication (NFC) reader, i.e., an NFC module, a fingerprint module, a keyboard module, a Bluetooth module, and the like). In this embodiment, state information of each of the unlocking modules is independently monitored, so that the state information of each of the unlocking modules can be clearly and unambiguously obtained, and after an unlocking module in an abnormal state is monitored, fault information of the unlocking module in the abnormal state is sent to a terminal device, so that a user can accurately and timely know the specific information of the fault which occurs, and locate a specific position where the fault occurs, which effectively reduces difficulties in detecting the fault and maintaining the smart door lock. Hereinafter, the process in FIG. 1 is specifically described:

Step 101: monitoring the state information of each of the unlocking modules independently.

Specifically, the smart door lock according to this embodiment includes any combination of the plurality of unlocking modules below: an NFC module, a Bluetooth module, a narrowband IOT module, a fingerprint module and a digital password module. The above-described unlocking modules are all hardware modules, and each of the unlocking modules corresponds to a separate thread for management, for example, the NFC module corresponds to an NFC thread, and the Bluetooth module corresponds to a Bluetooth thread, and the like. Each thread corresponding to each of the unlocking modules respectively is used to record the state information of each of the unlocking modules, and when an unlocking module is in an abnormal state, a thread corresponding to the unlocking module will record the state information of the unlocking module in an abnormal state. A specific form of the state information of the unlocking module in an abnormal state will not be limited, which may be text data or an error code, and the error code of the unlocking module may be data pre-stored in a management system of the smart door lock, for example, a set of corresponding relationships between abnormal states and error codes may be set for each of the unlocking modules and one error code of the unlocking module corresponds to one abnormal state of the unlocking module. In this embodiment, each of the unlocking modules and each thread corresponding to each of the unlocking modules are all independent, so the state information recorded in each thread corresponding to each of the unlocking module is read to obtain a state of each of the unlocking modules, thereby monitoring each of the unlocking modules independently.

Step 102: sending the fault information of the unlocking module in the abnormal state to the terminal device after monitoring the unlocking module in the abnormal state.

Specifically, when the state information recorded in the thread corresponding to the unlocking module is read as abnormality, the unlocking module is determined to be in the abnormal state, and the fault information of the unlocking module in the abnormal state is sent to the terminal device, so that the user can accurately and timely know a position where the fault occurs and the specific fault information of the unlocking module through the terminal device. The fault information of the unlocking module may include: a name of the unlocking module in the abnormal state and an error code of the unlocking module.

More specifically, when the unlocking module is in the abnormal state, there are the two following situations: the module is out of operation or the module is in a state of a low power. Accordingly, the fault information of the unlocking module further includes a fault type, the fault type includes: the module being out of operation or the module being in a state of a low power, and the fault type included in the fault information helps the user and maintenance personnel to take corresponding maintenance measures to repair the fault of the smart door lock.

For example, when the unlocking module is out of operation, the unlocking module cannot send and receive data normally, so the thread corresponding to the unlocking module records the state information of the unlocking module as abnormality, and determines the unlocking module to be in an abnormal state when the unlocking module fails to send and receive data for more than the preset number of times, and the fault information sent to the terminal device includes "the fault type of the module being out of operation". For example, when the Bluetooth module fails to send data and receives data overtime for multiple times, the Bluetooth module is determined to be in an abnormal state, and the fault information includes "the Bluetooth module being out of operation", when the narrowband IOT module fails to send data and receives data overtime through the narrowband IOT for multiple times, or fails to send a heartbeat packet to a server, the narrowband IOT module is determined to be in an abnormal state, and the fault information includes "the narrowband IOT module being out of operation".

For example, in a situation that the unlocking module is in a state of a low power, the unlocking module cannot work normally, and the thread corresponding to the unlocking module records the state information of the unlocking module as abnormality, and determines the unlocking module to be in an abnormal state. In this embodiment, before the fault information of the unlocking module in the abnormal state is sent to the terminal device, a current voltage value of the unlocking module in the abnormal state is detected through an analog-to-digital conversion (ADC) module built into the smart door lock, the fault type of the unlocking module is determined to be "in a state of a low power" when the current voltage value of the unlocking module is lower than a preset threshold value, and the fault information sent to the terminal device includes "the module being in a state of a low power".

Figure 3:
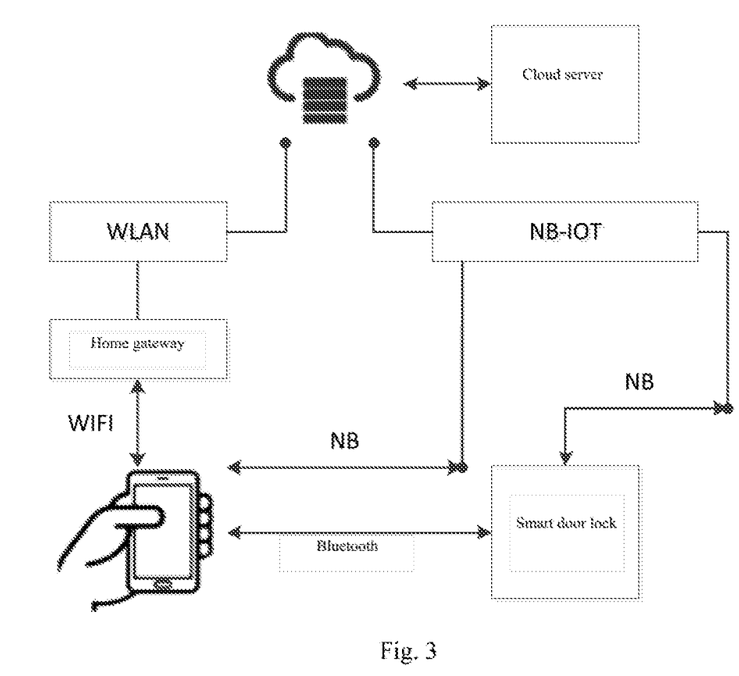
FIG. 3 is a system frame diagram of the smart door lock according to the first embodiment of the present disclosure.

More specifically, there are three ways of sending the fault information of the unlocking module in the abnormal state to the terminal device: sending the fault information to the terminal device through a short-range wireless communication module; or, sending the fault information to a cloud server through the network communication module, and sending the fault information to the terminal device via the cloud server; or, sending the fault information to a relay device through the short-range wireless communication module, and sending the fault information to the terminal device through the cloud server via the relay device. In this embodiment, a system frame diagram of a smart door lock is as shown in FIG. 3, and data such as the fault information is transparently transmitted through the cloud server.

For example, the fault information is directly sent to the terminal device through the short-range wireless communication module, and the short-range wireless communication module here includes the NFC module and the Bluetooth module. When the terminal device is located within a wireless communication range of the short-range wireless communication module built into the smart door lock and a connection is established between the terminal device and the smart door lock through the short-range wireless communication module, the fault information may be directly pushed to the terminal device through an NFC technology or a Bluetooth technology, which is convenient, fast and easy to be technically implemented, and enhances practicability in this embodiment. In addition, to meet the needs of various users, the users may also voluntarily send requests to the smart door lock to query current fault information by using technologies such as the Bluetooth technology.

Alternatively, the fault information may also be sent to the cloud server through the network communication module, and the fault information is sent to the terminal device via the cloud server; and the network communication module here includes the 2G/3G/4G/IOT module. The fault information is sent to the cloud server through the network communication module via a network, and the cloud server transparently transmits the fault information to the terminal device, which does not limit a geographical distance between the terminal device and the smart door lock, so that transmission of the fault information is more convenient.

Figure 4:
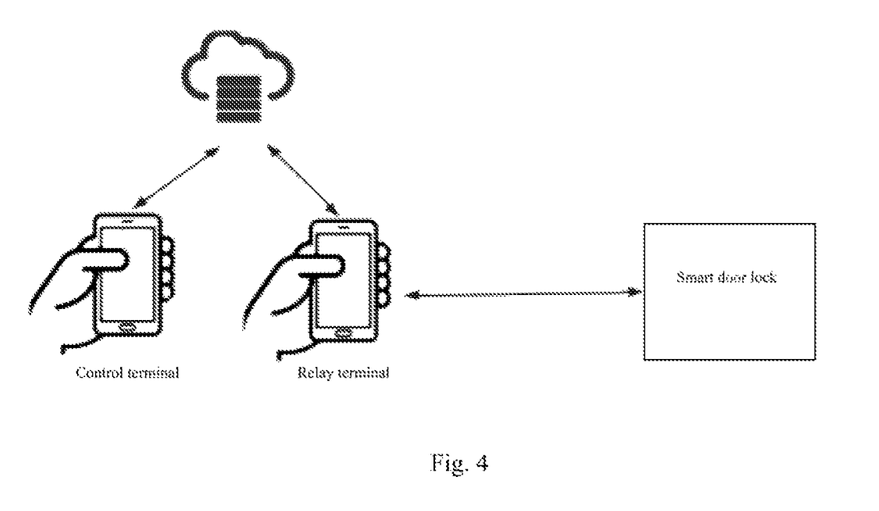
FIG. 4 is a schematic diagram of relay interaction according to the first embodiment of the present disclosure.

Alternatively, the fault information is sent to the relay device through the short-range wireless communication module, and the fault information is sent to the terminal device through the cloud server via the relay device, so as to be applied to situations where the smart door lock cannot send the fault information to the cloud server through the network communication module which means the network communication module of the smart door lock is out of operation or the smart door lock does not have a remote communication function. When the network communication module of the smart door lock is out of operation, in addition that the user's terminal device is taken as a control terminal, another relay terminal is set up, and the relay terminal is used as a short-range wireless communication access device of the smart door lock. The control terminal, the relay terminal and the smart door lock interact with each other through the cloud server, and a schematic diagram of the relay interaction is as shown in FIG. 4.

In the above-described system frame diagram, the control terminal has full access to the smart door lock and can perform operations such as entering and deleting unlocking passwords, the control terminal communicates with the cloud server through Hyper Text Transfer Protocol over Secure Socket Layer (HTTPS), and a user account of the control terminal is registered on the cloud server. The cloud server is configured to manage the registered user account of the control terminal and store data such as the password of the smart door lock, the cloud server communicates with the control terminal and the relay terminal through HTTPS, and pushes data to the control terminal and the relay terminal through a WebSocket communication protocol. The relay terminal communicates with the cloud server through HTTPS without registering on the cloud server, and the relay terminal communicates with the smart door lock through a Bluetooth Low Energy (BLE) technology, to support transparent transmission of data between the cloud server and the smart door lock. The smart door lock communicates with the relay terminal through the BLE technology, and communicates with the cloud server through a Constrained Application Protocol (COAP) or a Message Queuing Telemetry Transport (MQTT) Protocol, and the data transmitted between the smart door lock and the cloud server is encrypted by adopting a Transport Layer Security (TLS) protocol, but is visible to the relay terminal.

In the previous example, when the network communication module of the smart door lock is out of operation, another relay terminal is set up within a Bluetooth communication range of the smart door lock, so that the relay terminal establishes a transparent transmission connection with the smart door lock through the BLE technology. After detecting that the transparent transmission connection with the relay terminal is established through the BLE technology, the smart door lock establishes a connection with the cloud server through a BLE communication channel and a network communication (that is, HTTPS) channel of the relay terminal, and sends the fault information to the cloud server. The cloud server sends the received fault information to the control terminal through the WebSocket communication protocol, so that the user can still accurately and timely know a position where the fault occurs and the specific fault information of the unlocking module through the control terminal when the network communication module of the smart door lock is out of operation. In practical applications, the smart door lock that needs to implement a network communication function through a Bluetooth gateway may implement the network communication function through the above-described interaction with the relay terminal and the cloud server, thereby saving an additional hardware overhead of the Bluetooth gateway. In addition, remote unlocking may also be implemented in this embodiment, and the specific details are as follows. After the smart door lock establishes a connection with the cloud server, the cloud server notifies the relay terminal that the transparent transmission connection is successful, and the relay terminal initiates an unlocking request to the control terminal through the cloud server. After receiving the unlock request, the control terminal logs in the account registered on the cloud server and enters the digital password of the smart door lock. If the entered digital password matches the password of the smart door lock stored on the cloud server, the cloud server sends the digital password back to the relay device, the relay device sends the digital password to the smart door lock through the transparent transmission connection. When the smart door lock determines that the password is correct, an unlocking operation on the lock body is performed through the lock body drive module, so as to implement remote unlocking.

An example is specifically described below: taking a NFC module as an example, the NFC module is connected with a processor through a serial peripheral interface (SPI). When the NFC module works normally, a thread corresponding to the NFC module sends a patrol card request to determine whether there is an NFC chip nearby, if there isn't an NFC chip nearby, a value of 0 is returned in response to the request, and if there is an NFC chip nearby, a chip ID of the existing NFC chip as a value is returned in response to the request. When the NFC module is in an abnormal state, data that indicates an SPI sending error, or an SPI receiving error, or a timeout error or the like is returned in response to the request, and the thread corresponding to the NFC module will record that "the NFC module is in an abnormal state" and an error code corresponding to the abnormal state of the NFC module. After receiving the above-described content recorded in the thread corresponding to the NFC module, the fault information of the NFC module in the abnormal state (that is, "the NFC module is out of operation", and the like) is sent to a terminal device through a narrowband IOT module, and at the same time, the terminal device may be connected with a smart door lock through Bluetooth, and voluntarily query that the NFC module is in the abnormal state.

Compared with existing technologies, the state information of each of the unlocking modules are independently monitored by reading the state information of recorded in each thread corresponding to each of the unlocking modules respectively, which is easy to be technically implemented in this embodiment. When the unlocking module in the abnormal state is monitored, the fault information of the unlocking module in the abnormal state is sent to the terminal device through the short-range wireless communication module, the network communication module or the cloud server, which is suitable for reporting fault information in various situations and meeting the needs of various users, and is convenient, fast and easy to be technically implemented, thereby effectively enhancing feasibility and practicability in this embodiment. Meanwhile, remote unlocking may also be implemented through interaction between the relay device and the cloud server, which brings convenience to the user's life.

Figure 5:
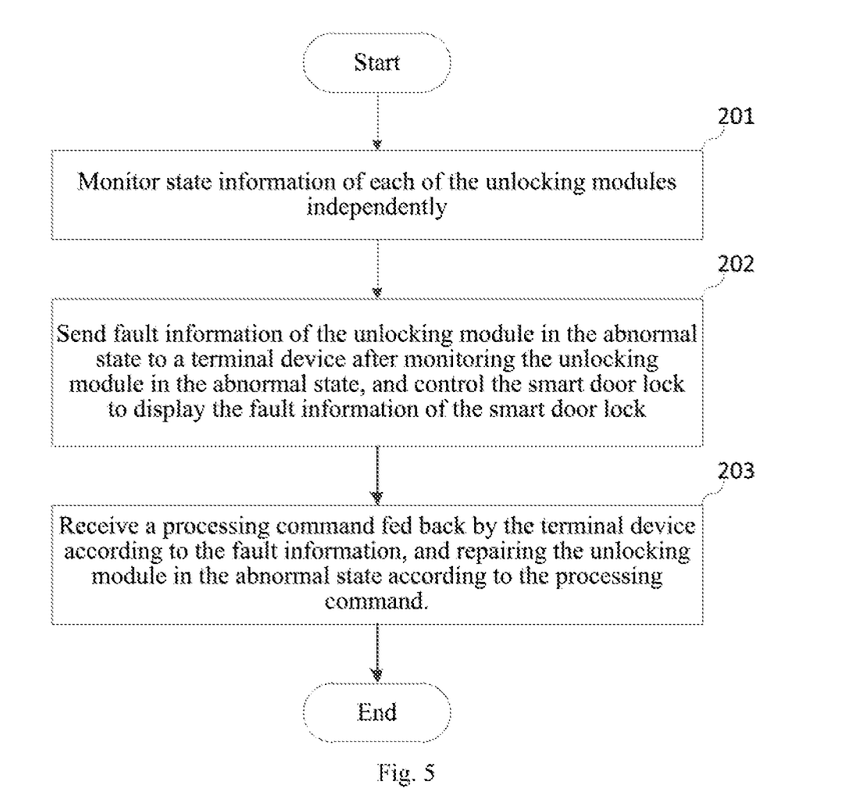
FIG. 5 is a flow chart of a method for detecting a fault of a smart door lock according to a second embodiment of the present disclosure.

A second embodiment of the present disclosure relates to a method for detecting a fault of a smart door lock, and a specific process is as shown in FIG. 5.

This embodiment is substantially the same with the first embodiment, and a specific difference is as follows. In the second embodiment, after the unlocking module in the abnormal state is detected, the smart door lock is further controlled to display the fault information of the smart door lock, in order to intuitively display the fault information on the smart door lock. In addition, the processing command fed back by the terminal device according to the fault information is further received and the unlocking module in the abnormal state is repaired, so that some minor faults of the smart door lock can be repaired autonomously without affecting normal use of the smart door lock. Hereinafter, the process in FIG. 5 is specifically described:

Step 201: monitoring the state information of each of the unlocking modules independently. The step is substantially the same with step 101, and no details will be repeated here.

Step 202: sending the fault information of the unlocking module in the abnormal state to the terminal device after the unlocking module in the abnormal state is monitored, and controlling the smart door lock to display the fault information of the smart door lock.

Specifically, a specific difference between step 202 and step 102 is that: after the unlocking module in the abnormal state is monitored, the smart door lock is controlled to display the fault information of the smart door lock. The fault information of the smart door lock is displayed on the smart door lock through a light emitting diode (LED) module built into the smart door lock, without limiting specific implementations. For example, the LED module may be an LED display screen on the smart door lock, which, in a form of text, displays a name of the unlocking module that is currently in the abnormal state, or an error code of the unlocking module that is currently in the abnormal state, and the like. Or the LED module may be a plurality of LED lights, which displays the fault information of the smart door lock through combinations of the number of lights which are lit or colors of lights which are lit, and the like, and according preset correspondence between the combinations of the lights which are lit and the fault information. In addition, in this embodiment, a preset audio may also be played by an audio module built into the smart door lock, so as to achieve a purpose of giving an alarm of the fault information of the smart door lock.

Step 203: receiving the processing command fed back by the terminal device according to the fault information, and repairing the unlocking module in the abnormal state according to the processing command.

Specifically, when the terminal device receives the fault information, the processing command is fed back to the smart door lock through the terminal device. In this embodiment, when the processing command fed back is a reset command, the unlocking module in the abnormal state is reset, and when the processing command fed back is a close command, the unlocking module in the abnormal state is closed. The unlocking module is controlled to reset itself autonomously, so that normal use of the smart door lock will not be affected when the fault of the unlocking module can be repaired by operations such as resetting, which also avoids dispatching maintenance personnel, and the unlocking module is closed when the fault of the unlocking module cannot be solved by the operations such as resetting, waiting for professional maintenance personnel to repair, so as to save power consumption of the smart door lock.

When the processing command fed back by the terminal device is the reset command, the unlocking module in the abnormal state is reset through a low dropout (LDO) regulator module built into the smart door lock. When the processing command fed back by the terminal device is the close command, a power supply to the unlocking module in the abnormal state is cut off through the LDO regulator module, and a thread corresponding to the unlocking module is closed.

Figure 6:
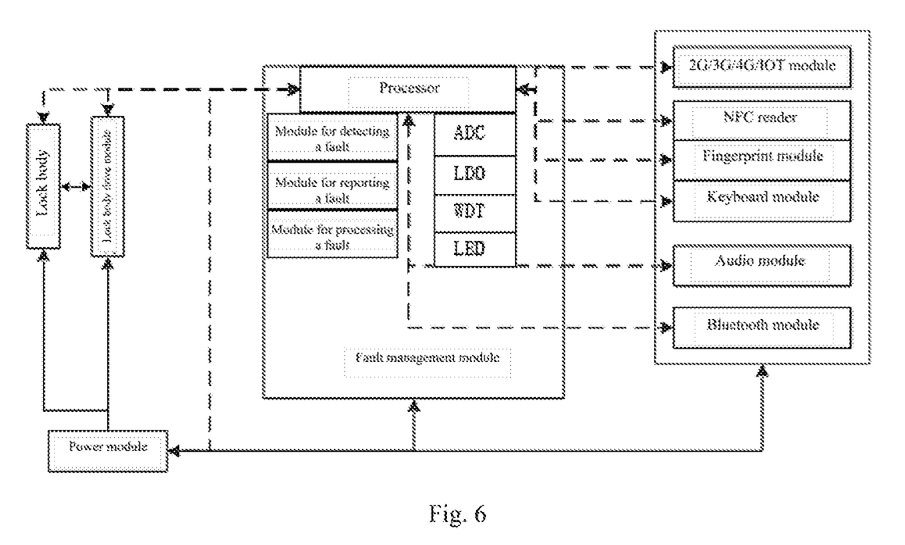
FIG. 6 is a structural schematic diagram of the smart door lock according to the second embodiment of the present disclosure.

A specific structure of the smart door lock according to this embodiment is as shown in FIG. 6: the smart door lock has a built-in fault management module, and the fault management module includes hardware and software; the hardware mainly includes an ADC module, a LDO regulator module, an LED module, and a watch dog timer (WDT) module; and the software mainly includes a module for detecting a fault, a module for reporting a fault and a module for processing a fault.

With respect to the hardware, the ADC module is configured to detect a current voltage of the unlocking module in the abnormal state, the LDO regulator module is configured to reset or close the unlocking module in the abnormal state according to the processing command fed back by the terminal device, the LED module is configured to display the fault information of the smart door lock on the smart door lock, and the WDT module is configured to monitor a state of a current processor that controls the unlocking module.

With respect to the software, the module for detecting a fault is configured to monitor the state information of each of the unlocking modules independently, the module for reporting a fault is configured to send the fault information of the unlocking module in the abnormal state to the terminal device after the unlocking module in the abnormal state is monitored, and the module for processing a fault is configured to control the LDO regulator module to repair the unlocking module in the abnormal state according to the processing command fed back by the terminal device.

Compared with existing technologies, the fault information of the smart door lock is displayed by the LED module after the unlocking module in the abnormal state is monitored in this embodiment, in order to intuitively display the fault information on the smart door lock, to facilitate repairing the smart door lock out of operation, so that in a situation where the smart door lock cannot report the fault information, the fault information of the smart door lock can also be obtained without the terminal device. In addition, the unlocking module in the abnormal state is also reset or closed according to the processing command fed back by the terminal device according to the fault information, so that normal use of the smart door lock will not be affected when the unlocking module out of operation can be repaired through a reset operation, which also avoids dispatching the maintenance personnel, and the unlocking module is closed when the unlocking module out of operation cannot be repaired by the reset operation, waiting for the professional maintenance personnel to repair, so as to save power consumption of the smart door lock.

Figure 7:
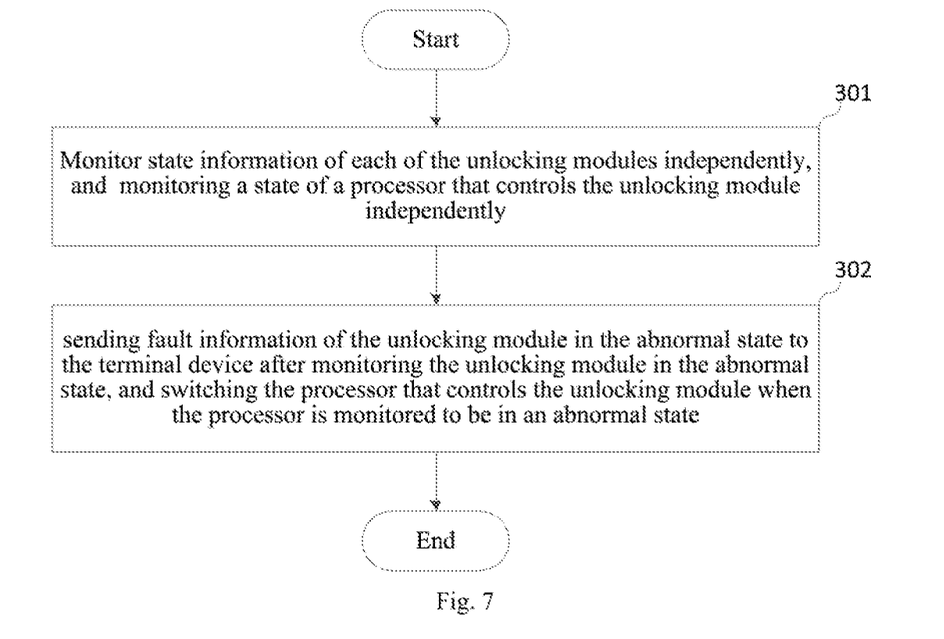
FIG. 7 is a flow chart of a method for detecting a fault of a smart door lock according to a third embodiment of the present disclosure.

A third embodiment of the present disclosure relates to a method for detecting a fault of a smart door lock, and a specific process is as shown in FIG. 7.

Figure 8:
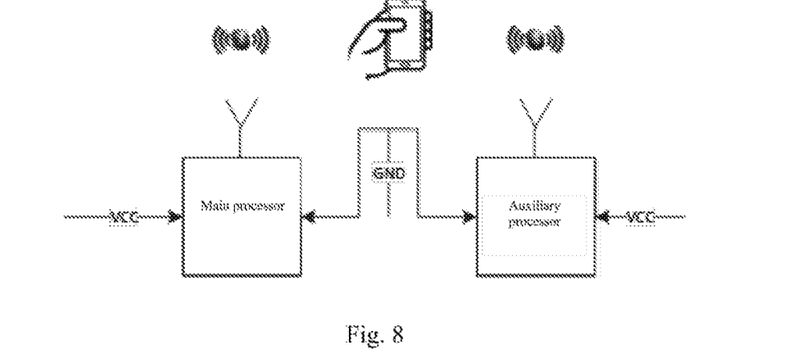
FIG. 8 is a structural schematic diagram of a smart door lock including a main processor and a auxiliary processor according to the third embodiment of the present disclosure.

This embodiment is substantially the same with the first embodiment, and a specific difference is that, in the third embodiment, the smart door lock further includes a main processor and an auxiliary processor that are configured to control a plurality of unlocking modules, and a structural diagram of the smart door lock which includes the main processor and the auxiliary processor is as shown in FIG. 8. When the plurality of unlocking modules are controlled by a processor, a state of the processor is also monitored, and the processor is switched when the processor is in an abnormal state, so as to ensure that the smart door lock may also work normally through a backup solution, which improves user experience. Hereinafter, the process in FIG. 7 is specifically described:

Step 301: monitoring the state information of each of the unlocking modules independently, and monitoring a state of a processor that controls the unlocking module independently.

Step 302: sending the fault information of the unlocking module in the abnormal state to the terminal device after the unlocking module in the abnormal state is monitored, and switching the processor that controls the unlocking module when the processor is monitored to be in an abnormal state.

Specifically, the smart door lock further includes the main processor and the auxiliary processor that are configured to control the plurality of unlocking modules, as well as a WDT connected with the main processor and connected with the auxiliary processor. When the plurality of unlocking modules are controlled by the main processor, a state of the main processor is monitored by the watchdog timer, and when the plurality of unlocking modules are controlled by the auxiliary processor, a state of the auxiliary processor is monitored by the watchdog timer, so that when the processor that currently controls the unlocking module is in an abnormal state, the processor is switched to ensure that the smart door lock can work normally. In general, when the smart door lock works normally, the plurality of unlocking modules are controlled by the main processor, and therefore, this embodiment exemplifies that the plurality of unlocking modules are controlled by the main processor.

More specifically, the WDT generally has one input which is referred to as "kicking the dog or service the dog". When a micro control unit of the processor works normally, a signal from the micro control unit will be output to a kicking terminal of the WDT at intervals, so that the WDT is reset. If the WDT is not kicked over a specified time period, the WDT will output a reset signal to the micro control unit to prevent the micro control unit from freezing. In this embodiment, when monitoring that the main processor does not "kick the dog" over a specified time period, the WDT switches a control of the plurality of unlocking modules to the auxiliary processor, and shuts down the main processor. There are specifically two ways of switching the processor: switching through a selection switch, or switching through a one-time fuse resistor device.

Switching the processor through a selection switch includes: sending, by the watchdog timer, a level to the selection switch after monitoring that the main processor is in an abnormal state, so that under an action of the level, the selection switch selects to enable the auxiliary processor, and at the same time, disable the main processor. The selection switch here may be a relay or other multiplexer.

Switching the processor through a one-time fuse resistor device includes: controlling, by the watchdog timer, the one-time fuse resistor device to disconnect the main processor from the circuit when monitoring that the main processor is in an abnormal state, and simultaneously implementing automatic switch to the auxiliary processor.

In addition, after the main processor in the abnormal state is repaired, the control of the plurality of unlocking modules may also be switched to the main processor by switching the selection switch or replacing a new one-time fuse resistor device. When the plurality of unlocking modules are controlled by the auxiliary processor and the auxiliary processor is in an abnormal state, the control of the plurality of unlocking modules may also be switched to the main processor in the above-described mode.

In other words, when the smart door lock works normally, the plurality of unlocking modules are controlled by the main processor, and the user may unlock in various unlocking ways supported by the smart door lock, such as NFC unlocking, Bluetooth unlocking and password unlocking, and when the main processor is in an abnormal state, the control of the plurality of unlocking modules is switched to the auxiliary processor, the auxiliary processor only provides one unlocking way, so that a design of the auxiliary processor is relatively simple, which effectively saves costs of the device.

Compared with existing technologies, the state of the processor that controls the plurality of unlocking modules is further monitored in this embodiment, and when the processor is in an abnormal state, a backup processor is switched, so as to ensure that the smart door lock may also work normally through a backup solution, which improves user experience.

The steps of the above various methods are divided only for clarity of description, and the steps may be combined to one step or some steps may be split into a plurality of steps when implemented, which are all within the protection scope of this disclosure as long as they include the same logical relationship. Additions of insignificant modifications or introductions of insignificant design to algorithms or processes without changing a core design of the algorithms and the processes, are all within the protection scope of this disclosure.

Figure 9:
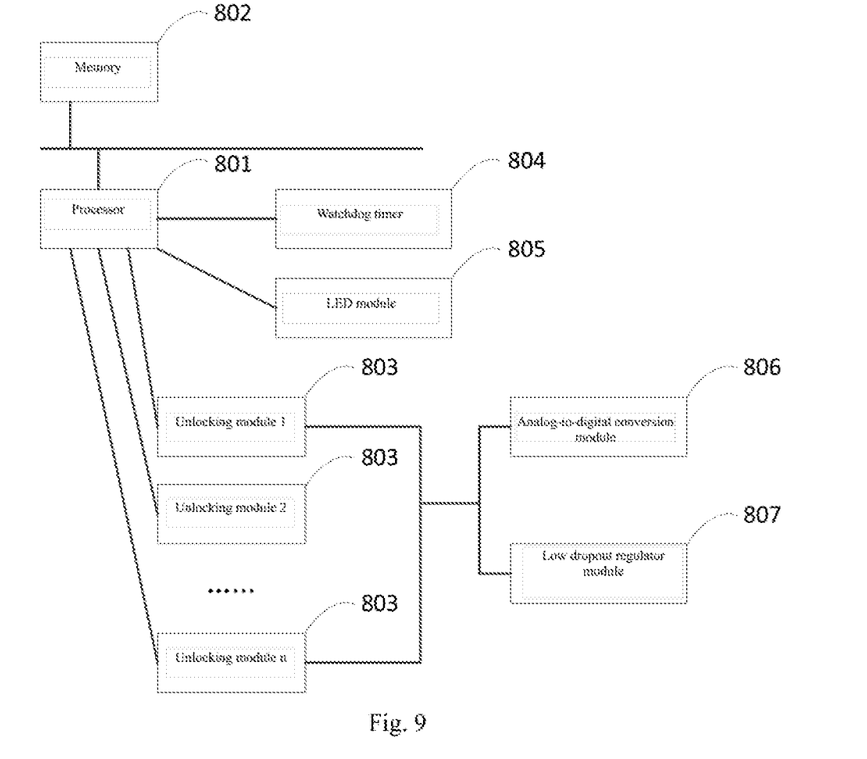
FIG. 9 is a structural diagram of a smart door lock according to a fourth embodiment of the present disclosure.

A fourth embodiment of the present disclosure relates to a smart door lock, as shown in FIG. 9, which includes: a plurality of unlocking modules 803, at least one processor 801 connected with the plurality of unlocking modules 803, and a memory 802 connected and communicated with the at least one processor 801, where the memory 802 stores instructions executable by the at least one processor 801, and the instructions are executed by the at least one processor 801 to perform the above-described method for detecting a fault of the smart door lock.

The memory 802 and the processor 801 are connected with each other via a bus, the bus may include any number of interconnected buses and bridges, and the buses connect various circuits of one or more processors and various circuits of the memory 802 together. The bus may also connect together various other circuits such as peripheral devices, voltage regulators and power management circuits, which are all well known in the art, and thus, will not be described further herein. A bus interface provides an interface between the bus and a transceiver. The transceiver may be a single element, or may also be a plurality of elements, such as a plurality of receivers and transmitters, which provides a unit for communicating with various other devices over a transmission medium. Data processed by the processor 801 is transmitted on a wireless medium through an antenna, and further, the antenna also receives the data and transmits the data to the processor 801.

The processor 801 is responsible for managing the bus and general processing, and may further provide various functions which includes timing, peripheral interfaces, voltage regulation, power management, and other control functions. The memory 802 may be configured to store data used by the processor 801 when executing operations. The processor 801 may include a main processor and an auxiliary processor, the smart door lock further includes a watchdog timer 804 connected with the main processor and connected with the auxiliary processor, and the watchdog timer 804 is configured to monitor whether the main processor and the auxiliary processor are in an abnormal state.

The smart door lock according to this embodiment further includes an LED module 805 connected with the processor, and the LED module 805 is configured to display fault information of the smart door lock.

The smart door lock according to this embodiment further includes an ADC module 806 connected with the plurality of unlocking modules 803, and the ADC module 806 is configured to detect whether a current voltage value of an unlocking module in an abnormal state is lower than a preset threshold value.

The smart door lock according to this embodiment further includes a LDO regulator module 807 connected with the plurality of unlocking modules 803, and the LDO regulator module 807 is configured to reset the unlocking module in the abnormal state when a processing command is a reset command, or close the unlocking module in the abnormal state when the processing command is a close command.

A fifth embodiment of the present disclosure relates to a computer-readable storage medium for storing a computer program. The computer program, when executed by the processor, performs the above-described embodiment of the method for detecting a fault of the smart door lock.

That is, those skilled in the art may understand that implementation of all or some steps in the methods according to the above-described embodiments may be completed by related hardware instructed by a program, the program may be stored in a storage medium, and include a plurality of instructions so that a device (which may be a single chip microcomputer and a chip, and the like) or a processor executes all or some steps of the methods as described in each of the embodiments of the present disclosure. The above storage medium includes: various media that can store program codes, such as a USB flash disk, a mobile hard disk, a read-only memory (ROM), a random access memory (RAM), a magnetic disk or an optical disk.

Those ordinarily skilled in the art may understand that, each of the above-described embodiments are specific examples for implementing the present disclosure, and in an actual application, various changes can be made in forms and details without departing from the spirit and scope of the present disclosure.

What is claimed is:

1. A method for detecting a fault of a smart door lock, wherein the smart door lock comprises a plurality of unlocking modules being configured for supporting various unlocking ways, and the method comprises:
monitoring state information of each of the unlocking modules independently; and
sending fault information of an unlocking module in an abnormal state to a terminal device after monitoring the unlocking module in the abnormal state; wherein the fault information comprises a name of the unlocking module in the abnormal state, for locating a specific position where the fault occurs;
wherein the monitoring state information of each of the unlocking modules independently comprises:
reading the state information recorded in each thread corresponding to each of the unlocking modules respectively, wherein the each thread corresponding to each of the unlocking modules respectively is used to manage and record the state information of each of the unlocking modules; and
determining an unlocking module to be in an abnormal state, when the state information recorded in a thread corresponding to a module is abnormality.

2. The method for detecting a fault of the smart door lock according to claim 1, wherein the thread corresponding to the module records the state information as abnormality when the unlocking module meets the following condition:
the unlocking module fails to send or receive data for more than a preset number of times.

3. The method for detecting a fault of the smart door lock according to claim 1, wherein the fault information comprises a fault type;
and before sending fault information of an unlocking module in an abnormal state to a terminal device, the method further comprises:
detecting whether a current voltage value of the unlocking module in the abnormal state is lower than a preset threshold value; and
determining the fault type to be a low power if the current voltage value of the unlocking module in the abnormal state is lower than the preset threshold value.

4. The method for detecting a fault of the smart door lock according to claim 3, wherein detecting whether a current voltage value of the unlocking module in the abnormal state is lower than a preset threshold value comprises:
detecting whether the current voltage value of the unlocking module in the abnormal state is lower than the preset threshold value by using an analog-to-digital conversion (ADC) module built into the smart door lock.

5. The method for detecting a fault of the smart door lock according to claim 1, wherein, sending fault information of an unlocking module in an abnormal state to a terminal device comprises:
sending the fault information to the terminal device through a short-range wireless communication module; or,
sending the fault information to a cloud server through a network communication module, and sending the fault information to the terminal device via the cloud server; or,
sending the fault information to a relay device through the short-range wireless communication module, and sending the fault information to the terminal device through the cloud server via the relay device.

6. The method for detecting a fault of the smart door lock according to claim 1, further comprising:
receiving a processing command fed back by the terminal device according to the fault information; and
repairing the unlocking module in the abnormal state according to the processing command;
wherein the repairing the unlocking module in the abnormal state according to the processing command comprises:
resetting the unlocking module in the abnormal state when the processing command is a reset command; or,
closing the unlocking module in the abnormal state when the processing command is a close command.

7. The method for detecting a fault of the smart door lock according to claim 6, wherein, resetting the unlocking module in the abnormal state comprises: resetting the unlocking module in the abnormal state through a low dropout (LDO) regulator module built into the smart door lock; or,
closing the unlocking module in the abnormal state comprises: closing the unlocking module in the abnormal state through the LDO regulator module.

8. The method for detecting a fault of the smart door lock according to claim 1, wherein the smart door lock further comprises a main processor and an auxiliary processor that are configured to control the plurality of unlocking modules; the method further comprises:

monitoring a state of the main processor when the plurality of unlocking modules are controlled by the main processor, and switching a control of the plurality of unlocking modules to the auxiliary processor and shutting down the main processor when the main processor is monitored to be in an abnormal state;

monitoring a state of the auxiliary processor when the plurality of unlocking modules are controlled by the auxiliary processor, and switching the control of the plurality of unlocking modules to the main processor and shutting down the auxiliary processor, when the auxiliary processor is monitored to be in an abnormal state.

9. The method for detecting a fault of the smart door lock according to claim 8, wherein the smart door lock further comprises: a watchdog timer (WDT) connected with the main processor and connected with the auxiliary processor;

monitoring a state of the main processor comprises: monitoring whether the main processor is in an abnormal state by the WDT;

monitoring a state of the auxiliary processor comprises: monitoring whether the auxiliary processor is in an abnormal state by the WDT.

10. The method for detecting a fault of the smart door lock according to claim 1, wherein, after monitoring the unlocking module in the abnormal state, the method further comprises:

controlling the smart door lock to display the fault information of the smart door lock.

11. A smart door lock, comprising: a plurality of unlocking modules, at least one processor connected with the plurality of unlocking modules being configured for supporting various unlocking ways, and a memory connected and communicated with the at least one processor, wherein the memory stores instructions executable by the at least one processor, and the instructions are executed by the at least one processor to perform a method for detecting a fault of the smart door lock;

wherein the method comprises:
monitoring state information of each of the unlocking modules independently; and
sending fault information of an unlocking module in an abnormal state to a terminal device after monitoring the unlocking module in the abnormal state; wherein the fault information comprises a name of the unlocking module in the abnormal state, for locating a specific position where the fault occurs;
wherein the monitoring state information of each of the unlocking modules independently comprises:
reading the state information recorded in each thread corresponding to each of the unlocking modules respectively, wherein the each thread corresponding to each of the unlocking modules respectively is used to manage and record the state information of each of the unlocking modules; and
determining an unlocking module to be in an abnormal state, when the state information recorded in a thread corresponding to a module is abnormality.

12. The smart door lock according to claim 11, further comprising: an analog-to digital conversion (ADC) module connected with the plurality of unlocking modules;

wherein the fault information comprises a fault type;
and before sending fault information of an unlocking module in an abnormal state to a terminal device, the method further comprises:
detecting whether the current voltage value of the unlocking module in the abnormal state is lower than the preset threshold value by using the ADC module built into the smart door lock; and
determining the fault type to be a low power if the current voltage value of the unlocking module in the abnormal state is lower than the preset threshold value.

13. The smart door lock according to claim 11, further comprising:
receiving a processing command fed back by the terminal device according to the fault information; and
repairing the unlocking module in the abnormal state according to the processing command.

14. The smart door lock according to claim 13, wherein repairing the unlocking module in the abnormal state according to the processing command comprises:
resetting the unlocking module in the abnormal state when the processing command is a reset command; or,
closing the unlocking module in the abnormal state when the processing command is a close command.

15. The smart door lock according to claim 14, further comprising: a low dropout (LDO) regulator module connected with the plurality of unlocking modules;
wherein resetting the unlocking module in the abnormal state comprises: resetting the unlocking module in the abnormal state through the LDO regulator module built into the smart door lock; or,
closing the unlocking module in the abnormal state comprises: closing the unlocking module in the abnormal state through the LDO regulator module.

16. The smart door lock according to claim 11, wherein the processor comprises: a main processor and an auxiliary processor that are configured to control the plurality of unlocking modules;
the method further comprises:
monitoring a state of the main processor when the plurality of unlocking modules are controlled by the main processor, and switching a control of the plurality of unlocking modules to the auxiliary processor and shutting down the main processor when the main processor is monitored to be in an abnormal state;
monitoring a state of the auxiliary processor when the plurality of unlocking modules are controlled by the auxiliary processor, and switching the control of the plurality of unlocking modules to the main processor and shutting down the auxiliary processor, when the auxiliary processor is monitored to be in an abnormal state;
and the smart door lock further comprises: a watchdog timer (WDT) connected with the main processor and connected with the auxiliary processor;
monitoring a state of the main processor comprises: monitoring whether the main processor is in an abnormal state by the WDT;
monitoring a state of the auxiliary processor comprises: monitoring whether the auxiliary processor is in an abnormal state by the WDT.

17. The method for detecting a fault of the smart door lock according to claim 1, wherein the plurality of unlocking modules comprise any combination of unlocking modules below:
a near field communication NFC module, a Bluetooth module, a narrowband Internet of Things IOT module, a fingerprint module and a digital password module.

18. The method for detecting a fault of the smart door lock according to claim 9, wherein the switching the control of the plurality of unlocking modules to the auxiliary processor and shutting down the main processor when the main processor is monitored to be in an abnormal state is performed through a section switch and comprises:

sending, by the watchdog timer, a level to the selection switch after monitoring that the main processor is in an abnormal state; and, enabling the auxiliary processor, and simultaneously disabling the main processor through the selection switch under an action of the level to the selection switch.

19. The method for detecting a fault of the smart door lock according to claim 9, wherein the switching the control of the plurality of unlocking modules to the auxiliary processor and shutting down the main processor when the main processor is monitored to be in an abnormal state is performed through a one-time fuse resistor device and comprises:

controlling, by the watchdog timer, a one-time fuse resistor device to disconnect the main processor when monitoring that the main processor is in an abnormal state; and, implementing automatic switch to the auxiliary processor.

20. The smart door lock according to claim 11, wherein the smart door lock communicates with a control terminal through a relay device and a cloud server in turn to implement a remote unlocking, and the smart door lock is configured to:

receive a digital password from the relay device, wherein the digital password of the relay device is transmitted from an account registered on the cloud server where the control terminal logs and enters the digital password; and, perform an unlocking operation on a lock body through a lock body drive module of the smart door lock when the smart door lock determines that the digital password is correct.

* * * * *